(12) United States Patent
Jia et al.

(10) Patent No.: US 12,525,277 B2
(45) Date of Patent: Jan. 13, 2026

(54) DELAY CALIBRATION CIRCUIT, MEMORY, AND CLOCK SIGNAL CALIBRATION METHOD

(71) Applicant: XI'AN UNIIC SEMICONDUCTORS CO., LTD., Xi'an (CN)

(72) Inventors: Xuerong Jia, Xi'an (CN); Song Wang, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 121 days.

(21) Appl. No.: 18/428,328

(22) Filed: Jan. 31, 2024

(65) Prior Publication Data

US 2024/0171168 A1 May 23, 2024

Related U.S. Application Data

(63) Continuation of application No. PCT/CN2022/109478, filed on Aug. 1, 2022.

(30) Foreign Application Priority Data

Aug. 3, 2021 (CN) .......................... 202110887594.2

(51) Int. Cl.
*G11C 11/4076* (2006.01)
*G11C 7/22* (2006.01)

(52) U.S. Cl.
CPC .......... *G11C 11/4076* (2013.01); *G11C 7/222* (2013.01); *G11C 2207/2254* (2013.01)

(58) Field of Classification Search
CPC .......... H03K 5/1565; H03K 5/13; H03K 7/08; G11C 11/4076; G11C 29/028; G11C 29/50012; G11C 2207/2254; G11C 7/222
See application file for complete search history.

(56) References Cited

U.S. PATENT DOCUMENTS

| 8,917,113 B1 * | 12/2014 | Song .................. G01R 25/00 327/12 |
| 9,030,244 B1 * | 5/2015 | Luo .................. H03K 3/017 327/175 |

(Continued)

FOREIGN PATENT DOCUMENTS

| CN | 1335677 A * | 2/2002 | ............. H03K 5/133 |
| CN | 101826860 A | 9/2010 | |

(Continued)

OTHER PUBLICATIONS

International search report, International Application No. PCT/CN2022/109478, mailed Oct. 21, 2022 (15 pages).

*Primary Examiner* — Jay W. Radke

(57) ABSTRACT

A delay calibration circuit, a memory, and a clock signal calibration method are provided. The delay calibration circuit includes: a divided clock generation circuit, configured to receive an input external clock signal and output at least two channels of divided clock signals based on the external clock signal; a calibration circuit, connected to the divided clock generation circuit and configured to adjust delays of at least two channels of divided clock signals based on a trimming signal and output adjusted divided clock signals; and a detection circuit, connected to the calibration circuit and configured to detect pulse widths of the at least two channels of divided clock signals and generate the trimming signal based on the pulse widths.

18 Claims, 8 Drawing Sheets

(56) References Cited

U.S. PATENT DOCUMENTS

| | | | |
|---|---|---|---|
| 9,705,512 B1* | 7/2017 | Kuan | H03L 7/0898 |
| 10,211,842 B2* | 2/2019 | Zhao | H03L 7/091 |
| 2007/0210841 A1* | 9/2007 | Kim | G11C 7/1072 |
| | | | 327/158 |
| 2008/0204094 A1* | 8/2008 | Hur | G11C 7/222 |
| | | | 327/158 |
| 2013/0106479 A1* | 5/2013 | Kim | H03K 5/1565 |
| | | | 327/175 |
| 2013/0182516 A1* | 7/2013 | Kinoshita | G11C 8/18 |
| | | | 365/194 |
| 2019/0333553 A1* | 10/2019 | Choi | G11C 7/1093 |
| 2020/0381029 A1* | 12/2020 | Kim | G11C 7/225 |
| 2022/0052678 A1* | 2/2022 | Choi | G11C 7/222 |
| 2022/0247390 A1* | 8/2022 | Kim | H03L 7/0812 |

FOREIGN PATENT DOCUMENTS

| | | | | |
|---|---|---|---|---|
| CN | 110266294 A | 9/2019 | | |
| CN | 110581701 A | 12/2019 | | |
| CN | 112787634 A | 5/2021 | | |
| KR | 101196014 B1 * | 11/2012 | | H03K 5/1565 |
| WO | 2020077557 A1 | 4/2020 | | |

* cited by examiner

| detecting pulse widths of at least two channels of previous adjusted divided clock signals, and generating a trimming signal based on the pulse widths | S11 |

| adjusting delays of at least two channels of divided clock signals based on the trimming signal, and outputting at least two channels of current adjusted divided clock signals | S12 |

DELAY CALIBRATION CIRCUIT, MEMORY, AND CLOCK SIGNAL CALIBRATION METHOD

CROSS REFERENCE TO RELATED APPLICATIONS

The present disclosure is a continuation of International Patent Application No. PCT/CN2022/109478, filed Aug. 1, 2022, which claims the priority of Chinese Patent Application NO. 202110887594.2 filed Aug. 3, 2021, both of which are herein incorporated by reference in their entirety.

TECHNICAL FIELD

The present disclosure relates to the field of memory technologies, and in particular to a delay calibration circuit, a memory, and a clock signal calibration method.

BACKGROUND

A Dynamic Random Access Memory (DRAM) is a kind of semiconductor memory, which is configured to realize a fast data read and write function.

A read and write speed of a memory is related to a read and write frequency thereof. Therefore, how to improve the read and write frequency of the memory is a technical problem that needs to be solved urgently at present.

SUMMARY OF THE DISCLOSURE

According to a first aspect of the embodiments of the present disclosure, a delay calibration circuit is provided. The delay calibration circuit includes: a divided clock generation circuit, configured to receive an input external clock signal and output at least two channels of divided clock signals based on the external clock signal; a calibration circuit, connected to the divided clock generation circuit, and configured to adjust delays of the at least two channels of divided clock signals based on a trimming signal and output at least two channels of current adjusted divided clock signals; and a detection circuit, connected to the calibration circuit, and configured to detect pulse widths of at least two channels of previous adjusted divided clock signals and generate the trimming signal based on the pulse widths.

According to a second aspect of the embodiments of the present disclosure, a memory is provided. The memory includes: a memory chip; and the above-mentioned delay calibration circuit, connected to the memory chip and configured to receive the external clock signal from the memory chip.

According to a third aspect of the embodiments of the present disclosure, a clock signal calibration method is provided. The clock signal calibration method includes: detecting pulse widths of at least two channels of previous adjusted divided clock signals, and generating a trimming signal based on the pulse widths; where the at least two channels of previous adjusted divided clock signals are generated based on an external clock signal; and adjusting delays of at least two channels of divided clock signals based on the trimming signal, and outputting at least two channels of current adjusted divided clock signals.

BRIEF DESCRIPTION OF THE DRAWINGS

In order to illustrate more clearly the technical solutions in the embodiments or the related art of the present disclosure, the accompanying drawings used for the description of the embodiments or the related art will be described in brief in the following. Apparently, the drawings in the following description are only some of the embodiments of the present disclosure, and other drawings may be obtained by any ordinary skilled person in the art based on these drawings without any creative work.

DETAILED DESCRIPTION

The technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments acquired by the ordinary skilled in the art based on the embodiments in the present disclosure without the creative work are all within the scope of the present disclosure.

Figure 1:
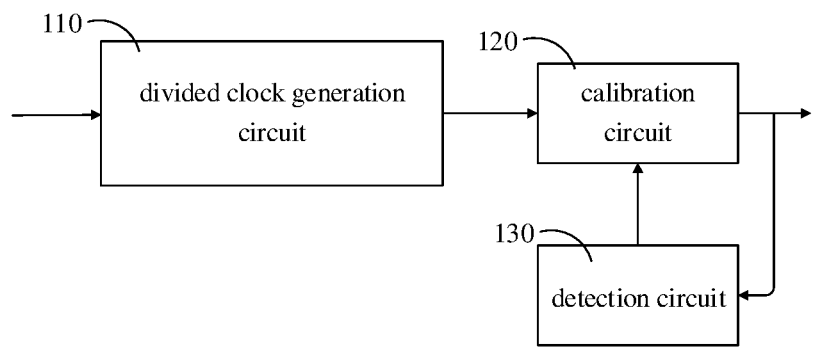
FIG. 1 is a schematic structural diagram of a delay calibration circuit according to some embodiments of the present disclosure.

As shown in FIG. 1, FIG. 1 is a schematic structural diagram of a delay calibration circuit according to some embodiments of the present disclosure. A delay calibration circuit includes: a divided clock generation circuit 110/frequency division clock generation circuit 110, a calibration circuit 120, and a detection circuit 130.

The divided clock generation circuit 110 is configured to receive as input an external clock signal and output at least two channels of divided clock signals based on the external clock signal.

In some embodiments, the divided clock signals may be obtained by using a division unit (Div2) to perform a frequency division operation on the external clock signal (wckt and wckc). The number of frequency divisions may be flexibly set based on actual needs, for example, two or four channels may be obtained.

In the present disclosure, an embodiment that the divided clock generation circuit 110 outputs four channels of divided clock signals may be taken as an example for description. In some embodiments, the four channels of divided clock signals include a first divided clock signal (wckd2_00), a second divided clock signal (wckd2_90), a third divided clock signal (wckd2_180), and a fourth divided clock signal (wckd2_270). A phase difference between the four channels of divided clock signals is 90° in sequence, that is, a phase difference between the first divided clock signal and the second divided clock signal is 90°, a phase difference between the second divided clock signal and the third divided clock signal is 90°, and a phase difference between the third divided clock signal and the fourth divided clock signal is 90°, and a frequency of each divided clock signal may be 1/2 of a frequency of the external clock signal.

In some embodiments, the external clock signal may be generated by a high-frequency clock signal source other than a delay calibration circuit provided by some embodiments of the present disclosure. The high-frequency clock signal source may be located in the memory (such as a Dynamic Random Access Memory (DRAM)), or may be located in a central processing unit (CPU) communicated with the memory, which is not limited herein. The divided clock signal output by the divided clock generation circuit 110 may be output to a data path (dp_1 bit, dp_2 bit) of the memory to trigger the memory to read and write data.

The calibration circuit 120 is connected to the divided clock generation circuit 110, and configured to adjust delays of at least two channels of divided clock signals based on a trimming signal and output current adjusted divided clock signals.

In some embodiments, a Duty Cycle Adjuster (DCA) may be configured to adjust the delays of the divided clock signals based on the trimming signal, and output the current adjusted divided clock signals.

The trimming signal belongs to a Trimming Code, and based on the trimming signal, the duty cycle adjuster may adjust a delay of a rising edge of a divided clock signal received by the duty cycle adjuster.

The detection circuit 130 is connected to the calibration circuit 120, and configured to detect pulse widths of at least two channels of previous adjusted divided clock signals, and generate the trimming signal based on the pulse widths.

In some embodiments, a Digital Clock Manager (DCM) may be configured to detect the pulse width of the previous adjusted divided clock signal and generate the trimming signal based on a detection result.

In a high-speed clock path of a current high-speed DRAM chip, an external clock signal generated by an external clock signal source is performed with frequency division and converted into four channels of divided clock signals. The four channels of divided clock signals are sent to each Datapath (dp_1 bit, dp_2 bit) of the DRAM through a Current Mode Logic (CML) buffer and a clock tree transmission path. Finally, the four channels of divided clock signals will be used for data acquisition and release of the DRAM.

Since a length of a clock tree transmission path corresponding to the four channels of divided clock signals may not be the same, there may be a different transmission delay between the four channels of divided clock signals. Since each of the four channels of divided clock signals are configured to generate a control clock signal which is configured to control data acquisition and release, a transmission delay between the four channels of divided clock signals may cause a change in a duty cycle of the control clock signal, resulting in affecting the pulse width of the control clock signal, and thus it may affect the quality of eye image data, an upper limit of a data read and write speed of the DRAM chip, and a read and write frequency.

In some embodiments of the present disclosure, the divided clock generation circuit 110 is arranged with the calibration circuit 120 and the detection circuit 130. The detection circuit 130 may detect the pulse widths of the at least two channels of previous adjusted divided clock signals, and generate the trimming signal based on the pulse width. The calibration circuit 120 may adjust the delays of the at least two channels of divided clock signals based on the trimming signal, and output the current adjusted divided clock signals which may be used by the memory. In some embodiments of the present disclosure, it may be possible to reduce an impact of an original low-quality external clock signal on the pulse width of the divided clock signal, improve a stability of the divided clock signal, and improve the read and write frequency of the memory, thereby enabling the memory to perform a high-speed data read and write operation under the trigger of a more stable current adjusted divided clock signal.

In a practical application, the external clock signal further includes a wckt clock signal and a wckc clock signal that are clock signals opposite to each other in phase. The divided clock generation circuit 110 may output the four channels of divided clock signals (wckd2_00, wckd2_90, wckd2_180, and wckd2_270) based on the wckt clock signal and the wckc clock signal.

Figure 2:
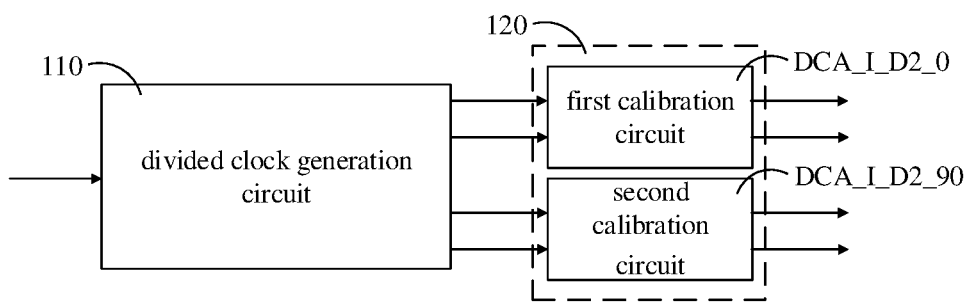
FIG. 2 is a connection schematic diagram of a calibration circuit according to some embodiments of the present disclosure.

As shown in FIG. 2, FIG. 2 is a connection schematic diagram of a calibration circuit according to some embodiments of the present disclosure. The calibration circuit 120 further includes a first calibration circuit (DCA_I_D2_0) and a second calibration circuit (DCA_I_D2_90).

The first calibration circuit (DCA_I_D2_0) is connected to the divided clock generation circuit 110, and configured to adjust delays corresponding to rising edges of two channels of the divided clock signals (wckd2_00 and wckd2_180, namely, the first divided clock signal and the third divided clock signal) based on a first trimming signal (dca_i_00<3:0>) of the trimming signal, and output two channels of calibrated divided clock signals (namely, a first calibrated divided clock signal and a third calibrated divided clock signal).

In some embodiments, the first calibration circuit (DCA_I_D2_0) is configured to adjust the delays corresponding to the rising edges of the two channels of divided clock signals (wckd2_00 and wckd2_180, namely, the first divided clock signal and the third divided clock signal) based on the first trimming signal (dca_i_00<3:0>), so that the delays of the two channels of calibrated divided clock signals (namely, the delays of the first calibrated divided clock signal and the third calibrated divided clock signal) are equal to each other.

The second calibration circuit (DCA_I_D2_90) is connected to the divided clock generation circuit 110, and configured to adjust delays corresponding to rising edges of the other two channels of the divided clock signals (wckd2_90 and wckd2_270, namely, the second divided clock signal and the fourth divided clock signal) based on a second trimming signal (dca_i_90<3:0>) of the trimming signal, and output other two channels of calibrated divided clock signals (namely, a second calibrated divided clock signal and a fourth calibrated divided clock signal).

In some embodiments, the second calibration circuit (DCA_I_D2_90) is configured to adjust the delays corresponding to the rising edges of the other two channels of the divided clock signals (wckd2_90 and wckd2_270, namely, the second divided clock signal and the fourth divided clock signal) based on the second trimming signal (dca_i_90<3:0>), so that the delays of the other two channels of the calibrated divided clock signals (namely, the delays of the second calibrated divided clock signal and the fourth calibrated divided clock signal) are equal to each other.

Figure 3:
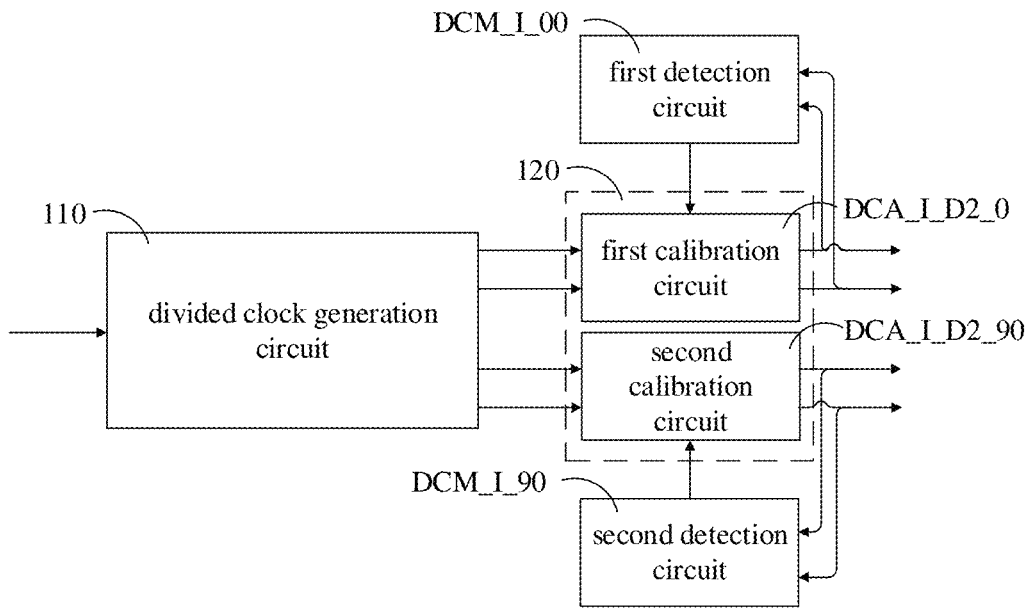
FIG. 3 is a connection schematic diagram of a detection circuit according to some embodiments of the present disclosure.

As shown in FIG. 3, FIG. 3 is a connection schematic diagram of a detection circuit according to some embodiments of the present disclosure. The detection circuit 130 further includes a first detection circuit (DCM_I_00) and a second detection circuit (DCM_I_90).

The first detection circuit (DCM_I_00) is connected to the first calibration circuit (DCA_I_D2_0), and configured to detect a first pulse width of each of two channels of previous calibrated divided clock signals (corresponding to wckd2_00 and wckd2_180, namely, a first previous calibrated divided clock signal and a third previous calibrated divided clock signal), and generate the first trimming signal (dca_i_00<3:0>) based on the first pulse width.

The second detection circuit (DCM_I_90) is connected to the second calibration circuit (DCA_I_D2_90), and configured to detect a second pulse width of each of the other two channels of the previous calibrated divided clock signals (corresponding to wckd2_90 and wckd2_270, namely, a second previous calibrated divided clock signal and a fourth previous calibrated divided clock signal), and generate the second trimming signal (dca_i_90<3:0>) based on the second pulse width.

In some embodiments, the first detection circuit (DCM_I_00) may be configured to detect pulse widths of the first previous calibrated divided clock signal (corresponding to wckd2_00) and the third previous calibrated divided clock signal (corresponding to wckd2_180), and obtain a comparison result of the pulse widths of the first previous calibrated divided clock signal (corresponding to wckd2_00) and the third previous calibrated divided clock signal (corresponding to wckd2_180), and thus a transmission delay difference on a clock tree between the first previous calibrated divided clock signal (corresponding to wckd2_00) and the third previous calibrated divided clock signal (corresponding to wckd2_180) is detected. Then, the first detection circuit (DCM_I_00) may generate a first adjustment parameter and control the first calibration circuit (DCA_I_D2_0) to adjust a duty cycle of the first divided clock signal (wckd2_00) and a duty cycle of the third divided clock signal (wckd2_180), thereby adjusting a delay of a rising edge of the first divided clock signal (wckd2_00) and a delay of a rising edge of the third divided clock signal (wckd2_180). Finally, the transmission delay difference on the clock tree between the first calibrated divided clock signal (corresponding to wckd2_00) and the third calibrated divided clock signal (corresponding to wckd2_180) is zero.

In some embodiments, the second detection circuit (DCM_I_90) may be configured to detect pulse widths of the second previous calibrated divided clock signal (corresponding to wckd2_90) and the fourth previous calibrated divided clock signal (corresponding to wckd2_270), and obtain a comparison result of the pulse widths of the second previous calibrated divided clock signal (corresponding to wckd2_90) and the fourth previous calibrated divided clock signal (corresponding to wckd2_270), and thus a transmission delay difference on the clock tree between the second previous calibrated divided clock signal (corresponding to wckd2_90) and the fourth previous calibrated divided clock signal (corresponding to wckd2_270) is detected. Then, the second detection circuit (DCM_I_90) may generate a second trimming signal (dca_i_90<3:0>), and the second detection circuit (DCM_I_90) is controlled to adjust a delay of a rising edge of the second divided clock signal (wckd2_00) and a delay of a rising edge of the fourth divided clock signal (wckd2_270), such that the transmission delay difference on the clock tree between the second calibrated divided clock signal (corresponding to wckd_290) and the fourth calibrated divided clock signal (corresponding to wckd_270) is zero.

Figure 4:
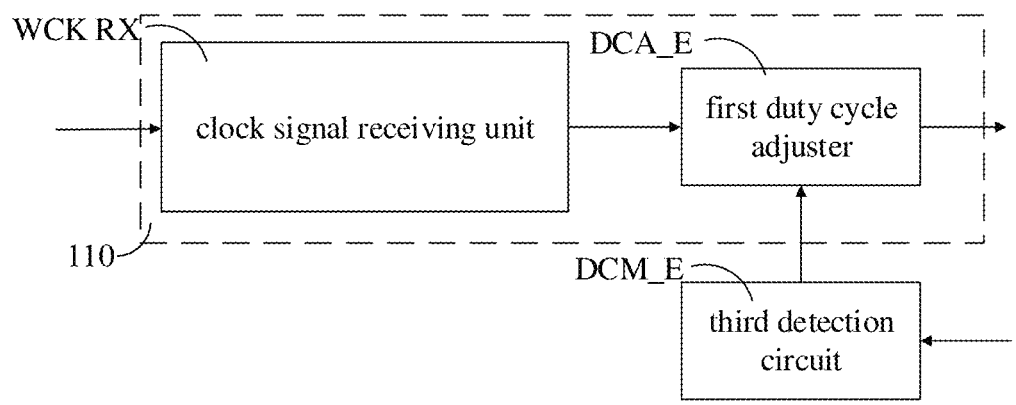
FIG. 4 is a connection schematic diagram of a divided clock generation circuit according to an embodiment of the present disclosure.

FIG. 4 is a connection schematic diagram of a divided clock generation circuit according to an embodiment of the present disclosure. The divided clock generation circuit 110 further includes a clock signal receiving unit (WCK RX) and a first duty cycle adjuster (DCA_E).

The clock signal receiving unit (WCK RX) is configured to receive and amplify the external clock signal.

The first duty cycle adjuster (DCA_E) is connected to the clock signal receiving unit (WCK RX), and configured to adjust a duty cycle of an amplified clock signal based on a duty cycle trimming signal (up/down) and output a calibrated clock signal.

In some embodiments, the first duty cycle adjuster (DCA_E) belongs to a duty cycle adjuster (DCA) that is configured to adjust the duty cycle of the amplified clock signal based on the duty cycle trimming signal (up/down).

The detection circuit 130 is further arranged with a third detection circuit (DCM_E). The third detection circuit (DCM_E) is connected to the first duty cycle adjuster (DCA_E) and configured to detect the duty cycle of the external clock signal. In response to the duty cycle deviating from a preset value, the third detection circuit (DCM_E) is configured to output the duty cycle trimming signal (up/down).

The Digital Clock Manager (DCM) may be used by the third detection circuit (DCM_E) to detect pulse widths of four channels of previous adjusted divided clock signals (corresponding to wckd2_00, wckd2_90, wckd2_180, and wckd2_270), and obtain a comparison result of the pulse widths of four channels of previous adjusted divided clock signals (corresponding to wckd2_00, wckd2_90, wckd2_180, and wckd2_270), and thus whether a duty cycle of a previous external clock signal is 50% may be detected.

The duty cycle trimming signal (up/down) may be generated by using a Finite State Machine (FSM). In some embodiments, the duty cycle trimming signal may include a UP state and a DOWN state. For example, the UP state may indicate that the duty cycle of the previous external clock signal is greater than 50%, and the DOWN state may indicate that the duty cycle of the previous external clock signal is less than 50%. An external controller external to the delay calibration circuit may generate a Trimming Code according to (based on) the duty cycle trimming signal (up/down), and control the divided clock generation circuit 110 to adjust a rising edge of the clock signal wckt of a current external clock signal or a rising edge of the clock signal wckc of a current external clock signal.

In some embodiments, when the duty cycle trimming signal (up/down) shows the UP state, the external controller is configured to control the first duty cycle adjuster (DCA_E) to reduce the duty cycle of the corresponding external clock signal. When the duty cycle trimming signal (up/down) shows the DOWN state, the external controller is configured to control the first duty cycle adjuster (DCA_E) to increase the duty cycle of the corresponding external clock signal.

In some embodiments, the external controller may be a memory controller of the Central Processing Unit (CPU).

Figure 5:
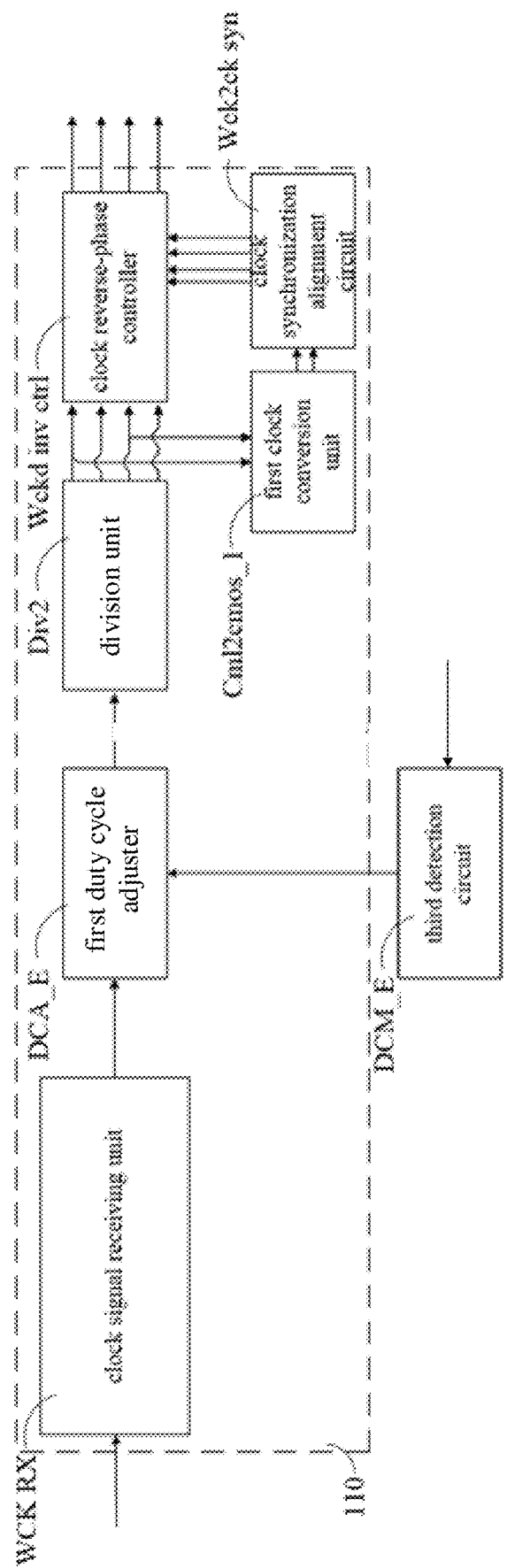
FIG. 5 is a connection schematic diagram of a divided clock generation circuit according to another embodiment of the present disclosure.

As shown in FIG. 5, FIG. 5 is a connection schematic diagram of a divided clock generation circuit according to another embodiment of the present disclosure. The divided clock generation circuit 110 further includes a division unit (Div2), a first clock conversion unit (Cml2cmos_1), a clock synchronization alignment circuit (Wck2ck syn), and a clock reverse-phase controller (Wckd inv ctrl).

The division unit (Div2) is connected to the first duty cycle adjuster (DCA_E), and configured to perform frequency division on the calibrated clock signal to obtain the four channels of pre-divided clock signals with a phase difference of 90° between them in sequence, a phase difference between a first pre-divided clock signal and a second pre-divided clock signal is 90°, a phase difference between the second pre-divided clock signal and a third pre-divided clock signal is 90°, and a phase difference between the third pre-divided clock signal and a fourth pre-divided clock signal is 90°.

The first clock conversion unit (Cml2cmos_1) is connected to the division unit (Div2), and configured to convert the pre-divided clock signals into a divided digital clock signal/frequency division digital clock signals.

The clock synchronization alignment circuit (Wck2ck syn) is connected to the first clock conversion unit (Cml2cmos_1), and configured to generate a reverse-phase control parameter based on the divided digital clock signal.

The clock reverse-phase controller (Wckd inv ctrl) is connected to the division unit (Div2) and the clock synchronization alignment circuit (Wck2ck syn). The clock reverse-phase controller (Wckd inv ctrl) is configured to perform reverse-phase processing on the two channels of the pre-divided clock signals (namely, the first pre-divided clock signal and the third pre-divided clock signal) and/or the other two channels of the pre-divided clock signals (namely, the second pre-divided clock signal and the fourth pre-divided clock signal) under the control of the reverse-phase control parameter, so as to align the two channels of the pre-divided clock signals (namely, the first pre-divided clock signal and the third pre-divided clock signal) and/or align the other two channels of the pre-divided clock signals (namely, the second pre-divided clock signal and the fourth pre-divided clock signal).

Figure 6:
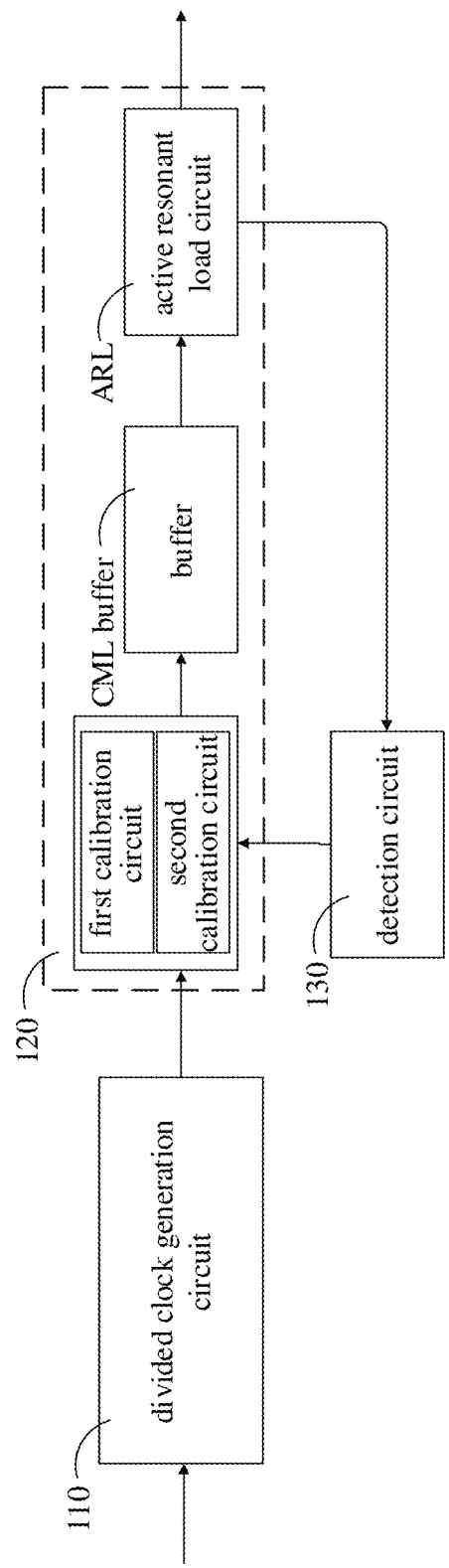
FIG. 6 is a connection schematic diagram of a delay calibration circuit according to some embodiments of the present disclosure.

As shown in FIG. 6, FIG. 6 is a connection schematic diagram of a delay calibration circuit according to some embodiments of the present disclosure. The calibration circuit 120 further includes a buffer (CML buffer) and an active resonant load circuit (ARL).

The buffer (CML buffer) is connected to the first calibration circuit (DCA_I_D2_0) and the second calibration circuit (DCA_I_D2_90) respectively.

The active resonant load circuit (ARL) is connected to the buffer (CML buffer), and configured to adjust a buffered calibrated divided clock signal transmitted to the active resonant load circuit (ARL) to match the calibrated divided clock signal transmitted to the buffer (CML buffer).

Figure 7:
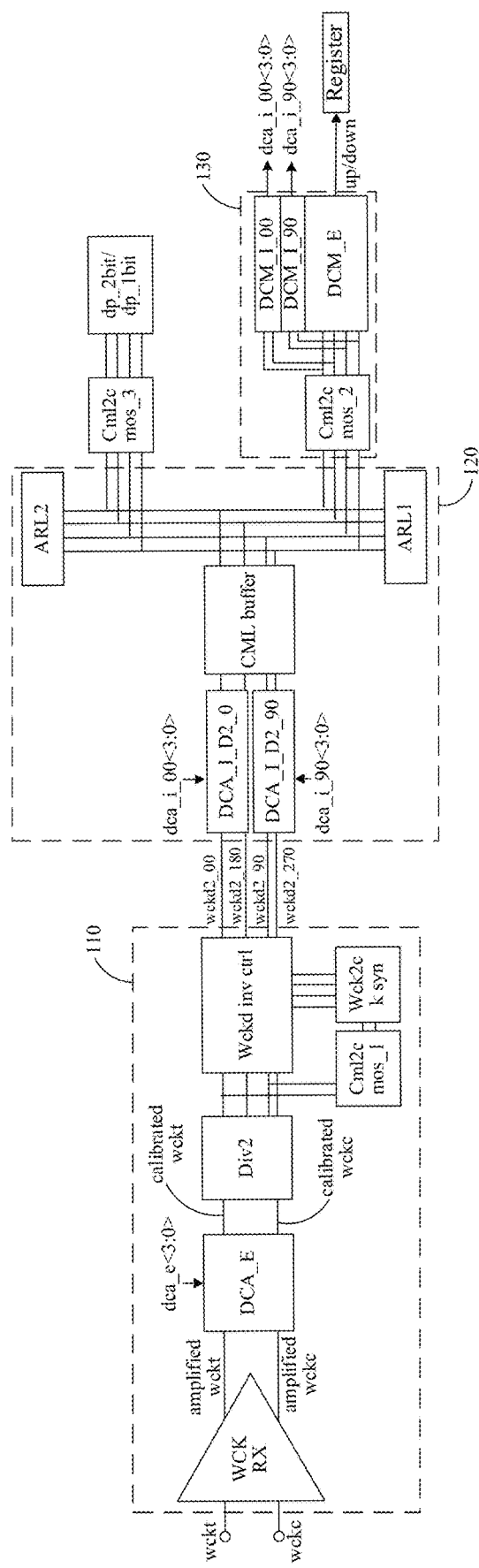
FIG. 7 is a schematic structural diagram of a delay calibration circuit according to some embodiments of the present disclosure.

In order to explain an operation principle of the embodiment in detail, a delay calibration circuit is provided by the embodiments of the present disclosure, which includes the above-mentioned parts. As shown in FIG. 7, FIG. 7 is a schematic structural diagram of a delay calibration circuit according to some embodiments of the present disclosure, so as to further explain an implementation process of the embodiment of the present disclosure.

As shown in FIG. 7, the clock signal receiving unit (WCK RX) and the first duty cycle adjuster (DCA_E) are jointly configured to receive and calibrate the external clock signal.

The clock signal receiving unit (WCK RX) is configured to receive and amplify the external clock signal generated by the clock signal source outside the delay calibration circuit. The clock signal receiving unit (WCK RX) includes two input ports, namely, a first input port and a second input port. The first input port of the clock signal receiving unit is configured to receive the wckt clock signal of the external clock signal and the second input port of the clock signal receiving unit is configured to receive the wckc clock signal of the external clock signal. The clock signal receiving unit (WCK RX) further includes two output ports, namely, a first output port and a second output port. The first output port of the clock signal receiving unit is configured to output an amplified wckt clock signal and the second output port of the clock signal receiving unit is configured to output an amplified wckc clock signal.

In some embodiments, the wckt clock signal and the wckc clock signal are clock signals opposite to each other in phase.

The first duty cycle adjuster (DCA_E) includes two input ports connected to the output ports of the clock signal receiving unit (WCK RX) in one-to-one correspondence. One input port of the first duty cycle adjuster (DCA_E) is configured to receive the amplified wckt clock signal, and the other input port thereof is configured to receive the amplified wckc clock signal.

The first duty cycle adjuster (DCA_E) is configured to calibrate duty cycles of the amplified wckt clock signal and the amplified wckc clock signal output by the clock signal receiving unit (WCK RX) to 50%, thereby ensuring that a calibrated clock signal entering the division unit (Div2) has a certain pulse width, and reducing the impact of the pulse width of the calibrated clock signal entering the division unit (Div2) on the highest operating frequency of the division unit (Div2).

In some embodiments, a first I/O end of the external controller is connected to a register, a second I/O end of the external controller is connected to a control end of the first duty cycle adjuster (DCA_E), and an output port of the third detection circuit (DCM_E) is connected to the register. The third detection circuit (DCM_E) is configured to output a duty cycle trimming signal (up/down) for storage in the register, and then the Trimming code (that is, dca_e<3:0>) is sent down by the external controller according to (based on) the duty cycle trimming signal (up/down) read from the register. In this way, the first duty cycle adjuster (DCA_E) may perform a corresponding operation according to dca_e<3:0>, and adjust a delay of a rising edge of the amplified wckt clock signal or a delay of a rising edge of the amplified wckc clock signal, so as to calibrate the duty cycles of the amplified wckt clock signal and the amplified wckc clock signal to 50%, thereby obtaining a calibrated wckt clock signal and a calibrated wckc clock signal.

In some embodiments, the Trimming code sent down by the external controller is the dca_e<3:0> as shown in FIG. 7, the dca_e<3:0> is generated by the external controller according to the duty cycle trimming signal (up/down).

The first duty cycle adjuster (DCA_E) is further arranged with two output ports. One of the two output ports is configured to output the calibrated wckt clock signal, and the other of the two output ports is configured to output the calibrated wckc clock signal.

As shown in FIG. 7, the division unit (Div2), the first clock conversion unit (Cml2cmos_1), the clock synchronization alignment circuit (Wck2ck syn), and the clock reverse-phase controller (Wckd inv ctrl) are jointly configured to perform frequency division on the calibrated wckt clock signal and the calibrated wckc clock signal to divide into the four channels of divided clock signals.

The division unit (Div2) includes two input ports connected to the output ports of the first duty cycle adjuster (DCA_E) in one-to-one correspondence. The two input ports of the division unit (Div2) are configured to receive the calibrated wckt clock signal and the calibrated wckc clock signal, respectively, and perform frequency division on the calibrated wckt clock signal and the calibrated wckc clock signal to divide into the four channels of divided clock signals (wckd2_00, wckd2_90, wckd2_180, and wckd2_270) with the phase difference between 90° in sequence.

The division unit (Div2) is further arranged with four output ports, which are configured to output the four channels of pre-divided clock signals (corresponding to wckd2_00, wckd2_90, wckd2_180, and wckd2_270), respectively.

The first clock conversion unit (Cml2cmos_1) is arranged with two input ports, namely, a first input port and a second input port. The first input port of the first clock conversion unit (Cml2cmos_1) may be connected to an output port of the division unit (Div2) configured to output a pre-divided clock signal corresponding to wckd2_00, and the second input port of the first clock conversion unit (Cml2cmos_1) may be connected to an output port of the division unit (Div2) configured to output a pre-divided clock signal corresponding to wckd2_90. Of course, the first input port of the first clock conversion unit (Cml2cmos_1) may further be connected to an output port of the division unit (Div2) configured to output a pre-divided clock signal corresponding to wckd2_180, and the second input port of the first clock conversion unit (Cml2cmos_1) may be connected to an output port of the division unit (Div2) configured to output a pre-divided clock signal corresponding to wckd2_270.

The first clock conversion unit (Cml2cmos_1) may be configured to convert a received clock signal of a Current Mode Logic (CML) type into a digital clock signal of a Complementary Metal Oxide Semiconductor (CMOS) type which may be used by the clock synchronization alignment circuit (Wck2ck syn).

The clock signal of the CML type belongs to a logic level signal of the CML type, and the logic level signal of the CML type is a common level signal in a high-speed data interface design. The digital clock signal of the CMOS type belongs to a logic level signal of the CMOS type, and the logic level signal of the CMOS type is a level signal output by a CMOS device (or a CMOS circuit) and is widely used in the high-speed data interface design.

As shown in FIG. 7, the first clock conversion unit (Cml2cmos_1) includes two input ports, namely, a first input port and a second input port. The first input port of the first clock conversion unit (Cml2cmos_1) is configured to receive the pre-divided clock signal corresponding to wckd2_00 of the CML type and the second input port of the first clock conversion unit (Cml2cmos_1) is configured to receive the pre-divided clock signal corresponding to wckd2_90 of the CML type, or the first input port of the first clock conversion unit (Cml2cmos_1) is configured to receive the pre-divided clock signal corresponding to wckd2_180 of the CML type and the second input port of the first clock conversion unit (Cml2cmos_1) is configured to receive the pre-divided clock signal corresponding to wckd2_270 of the CML type. The first clock conversion unit (Cml2cmos_1) includes two output ports, namely, a first output port and a second output port. The first output port of the first clock conversion unit (Cml2cmos_1) is configured to output a divided digital clock signal corresponding to wckd2_00 of the CMOS type and the second output port of the first clock conversion unit (Cml2cmos_1) is configured to output a divided digital clock signal corresponding to wckd2_90 of the CMOS type, or the first output port of the first clock conversion unit (Cml2cmos_1) is configured to output a divided digital clock signal corresponding to wckd2_180 of the CMOS type and the second output port of the first clock conversion unit (Cml2cmos_1) is configured to output a divided digital clock signal corresponding to wckd2_270 of the CMOS type.

The clock synchronization alignment circuit (Wck2ck syn) includes two input ports, namely, a first input port and a second input port, connected to the output ports of the first clock conversion unit (Cml2cmos_1) in one-to-one correspondence. That is, The first input port of the clock synchronization alignment circuit (Wck2ck syn) is connected to the first output port of the first clock conversion unit (Cml2cmos_1), and the second input port of the clock synchronization alignment circuit (Wck2ck syn) is connected to the second output port of the first clock conversion unit (Cml2cmos_1). The first input port of the clock synchronization alignment circuit (Wck2ck syn) is configured to receive the pre-divided clock signal corresponding to wckd2_00 of the CMOS type and the second input port of the clock synchronization alignment circuit (Wck2ck syn) is configured to receive the pre-divided clock signal corresponding to wckd2_90 of the CMOS type, or the first input port of the clock synchronization alignment circuit (Wck2ck syn) is configured to receive the pre-divided clock signal corresponding to wckd2_180 of the CMOS type and the second input port of the clock synchronization alignment circuit (Wck2ck syn) is configured to receive the pre-divided clock signal corresponding to wckd2_270 of the CMOS type.

The clock synchronization alignment circuit (Wck2ck syn) may determine whether the four channels of pre-divided clock signals (corresponding to wckd2_00, wckd2_90, wckd2_180, and wckd2_270) output by the division unit (Div2) need to be performed with reverse-phase processing based on the received divided digital clock signals (the divided digital clock signal corresponding to wckd2_00 of the CMOS type and the divided digital clock signal corresponding to wckd2_90 of the CMOS type, or the divided digital clock signal corresponding to wckd2_180 of the CMOS type and the divided digital clock signal corresponding to wckd2_270 of the CMOS type). In response to a need for reverse-phase processing, a reverse-phase control parameter is generated.

The clock reverse-phase controller (Wckd inv ctrl) is arranged with four input ports, which are connected to four output ports of the division unit (Div2), respectively, and are configured to receive four channels of pre-divided clock signals (corresponding to wckd2_00, wckd2_90, wckd2_180 and wckd2_270) output by the division unit (Div2).

The clock synchronization alignment circuit (Wck2ck syn) includes four output ports, which are respectively configured to output a wckd2_00 reverse-phase processing instruction, a wckd2_90 reverse-phase processing instruction, a wckd2_180 reverse-phase processing instruction, and a wckd2_270 reverse-phase processing instruction. Four control ends of the clock reverse-phase controller (Wckd inv ctrl) are respectively connected to four output ports of the clock synchronization alignment circuit (Wck2ck syn). When the wckd2_00 reverse-phase processing instruction, the wckd2_90 reverse-phase processing instruction, the wckd2_180 reverse-phase processing instruction, and the wckd2_270 reverse-phase processing instruction are activated, the four control ends of the clock reverse-phase controller (Wckd inv ctrl) are configured to trigger the clock reverse-phase controller (Wckd inv ctrl) to perform reverse-phase processing on two channels of the pre-divided clock signals (corresponding to wckd2_00 and wckd2_180, namely, the first pre-divided clock signal and the third pre-divided clock signal) and/or the other two channels of the pre-divided clock signals (corresponding to wckd2_90 and wckd2_270, namely, the second pre-divided clock signal and the fourth pre-divided clock signal).

The clock reverse-phase controller (Wckd inv ctrl) is arranged with four output ports, which are respectively configured to output the wckd2_00, the wckd2_90, the wckd2_180, and the wckd2_270. All of the wckd2_00, the wckd2_90, the wckd2_180, and the wckd2_270 output by the clock reverse-phase controller (Wckd inv ctrl) may be performed with or undergo reverse-phase processing, or none thereof may be performed with reverse-phase processing. In some embodiments, some of the wckd2_00, the wckd2_90, the wckd2_180, and the wckd2_270 output by the clock reverse-phase controller (Wckd inv ctrl) may be performed with reverse-phase processing, and the rest thereof may be not performed with reverse-phase processing.

As shown in FIG. 7, the first calibration circuit (DCA_I_D2_0), the second calibration circuit (DCA_I_D2_90), the buffer (CML buffer), the first active resonant load circuit (ARL1), and the second active resonant load circuit (ARL2) are jointly configured to calibrate and output the four channels of current adjusted divided clock signals.

The first calibration circuit (DCA_I_D2_0) is arranged with two input ports, which are respectively connected to the two output ports of the clock reverse-phase controller (Wckd inv ctrl) and configured to receive the first divided clock signal wckd2_00 and the third divided clock signal wckd2_180 output by the clock reverse-phase controller (Wckd inv ctrl).

A control end of the first calibration circuit (DCA_ID_D2_0) is connected to the output port of the first detection circuit (DCM_I_00), and configured to receive the first trimming signal (dca_i_00<3:0>) output by the first detection circuit (DCM_I_00).

The first calibration circuit (DCA_I_D2_0) may adjust the duty cycles of the received two divided clock signals (wckd2_00 and wckd2_180, namely, the first divided clock signal and the third divided clock signal) based on the received first trimming signal (dca_i_00<3:0>), and thus the delays of the rising edges of the received two divided clock signals (wckd2_00 and wckd2_180, namely, the first divided clock signal and the third divided clock signal) may be adjusted. Finally, the delay difference between the two channels of divided clock signals (wckd2_00 and wckd2_180, namely, the first divided clock signal and the third divided clock signal) may be calibrated.

The first calibration circuit (DCA_I_D2_0) includes two output ports which are configured to output the first calibrated divided clock signal corresponding to wckd2_00 and the third calibrated divided clock signal corresponding to wckd2_180, respectively.

The second calibration circuit (DCA_I_D2_90) is arranged with two input ports, which are respectively connected to the two output ports of the clock reverse-phase controller (Wckd inv ctrl) and are respectively configured to receive the second divided clock signal wckd2_90 and the fourth divided clock signal wckd2_270 output by the clock reverse-phase controller (Wckd inv ctrl).

A control end of the second calibration circuit (DCA_ID_D2_90) is connected to the output port of the second detection circuit (DCM_I_90) and configured to receive the second trimming signal (dca_i_90<3:0>) output by the second detection circuit (DCM_I_90).

The second calibration circuit (DCA_I_D2_90) may adjust the duty cycles of the received other two divided clock signals (wckd2_90 and wckd2_270, namely, the second divided clock signal and the fourth divided clock signal) based on the received second trimming signal (dca_i_90<3:0>), and thus the delays of the rising edges of the other two channels of divided clock signals (wckd2_90 and wckd2_270, namely, the second divided clock signal and the fourth divided clock signal) may be adjusted. Finally, the delay difference between the two channels of divided clock signals (wckd2_90 and wckd2_270, namely, the second divided clock signal and the fourth divided clock signal) may be calibrated.

The second calibration circuit (DCA_I_D2_90) includes two output ports, which are configured to output the second calibrated divided clock signal corresponding to wckd2_90 and the fourth calibrated divided clock signal corresponding to wckd2_270, respectively.

The buffer (CML buffer) is arranged with four input ports, which are connected to the output port of the first calibration circuit (DCA_I_D2_0) and the output port of the second calibration circuit (DCA_I_D2_90), respectively, and configured to receive and store the calibrated wckd2_00, the calibrated wckd2_180, the calibrated wckd2_90, and the calibrated wckd2_270, respectively.

The buffer (CML buffer) further includes four output ports, which are configured to output a buffered calibrated wckd2_00, a buffered calibrated wckd2_180, a buffered calibrated wckd2_90, and a buffered calibrated wckd2_270 stored in the buffer (CML buffer), respectively.

The first active resonant load circuit (ARL1) and the second active resonant load circuit (ARL2) belong to the active resonant load circuit (ARL). An input port of each the active resonant load circuit is correspondingly connected to an output port of the corresponding active resonant load circuit, and each active resonant load circuit belongs to a ring signal processing circuit.

The first active resonant load circuit (ARL1) includes four I/O ports. The four I/O ports of the first active resonant load circuit (ARL1) are respectively connected to the four output ports of the buffer (CML buffer), and are configured to receive the buffered calibrated wckd2_00, the buffered calibrated wckd2_180, the buffered calibrated wckd2_90, and the buffered calibrated wckd2_270 output by the buffer (CML buffer), respectively.

The second active resonant load circuit (ARL2) includes four I/O ports. The four I/O ports of the second active resonant load circuit (ARL2) are also respectively connected to the four output ports of the buffer (CML buffer), and are configured to receive the buffered calibrated wckd2_00, the buffered calibrated wckd2_180, the buffered calibrated wckd2_90, and the buffered calibrated wckd2_270 output by the buffer (CML buffer), respectively.

The first active resonant load circuit (ARL1) and the second active resonant load circuit (ARL2) are jointly configured to reshape a waveform of the buffered calibrated wckd2_00, the buffered calibrated wckd2_180, the buffered calibrated wckd2_90, and the buffered calibrated wckd2_270, and compensate for transmission loss of the buffered calibrated wckd2_00, the buffered calibrated wckd2_180, the buffered calibrated wckd2_90, and the buffered calibrated wckd2_270 in the clock tree transmission path, and thus the stability of the buffered calibrated wckd2_00, the buffered calibrated wckd2_180, the buffered calibrated wckd2_90, and the buffered calibrated wckd2_270 may be improved.

As shown in FIG. 7, the input port of the third detection circuit (DCM_E) is connected to the I/O ports of the first active resonant load circuit (ARL1) via the second clock conversion unit (Cml2cmos_2), and the output port of the third detection circuit (DCM_E) is connected to the register.

The second clock conversion unit (Cml2cmos_2) is arranged with four input ports, which are respectively connected to the four I/O ports of the first active resonant load circuit (ARL1), and is configured to convert a current adjusted wckd2_00 of the CML type output by the first active resonant load circuit (ARL1) into a converted adjusted wckd2_00 of the CMOS type, convert a current adjusted wckd2_180 of the CML type output by the first active resonant load circuit (ARL1) into a converted adjusted wckd2_180 of the CMOS type, convert a current adjusted wckd2_90 of the CML type output by the first active resonant load circuit (ARL1) into a converted adjusted wckd2_90 of the CMOS type, and convert a current adjusted wckd2_270 of the CML type output by the first active resonant load circuit (ARL1) into a converted adjusted wckd2_270 of the CMOS type, respectively.

The second clock conversion unit (Cml2cmos_2) includes four output ports, which are configured to output the converted adjusted wckd2_00 of the CMOS type, the converted adjusted wckd2_180 of the CMOS type, the converted adjusted wckd2_90 of the CMOS type, and the converted adjusted wckd2_270 of the CMOS type, respectively.

The third detection circuit (DCM_E) includes four input ports, which are respectively connected to the four output ports of the second clock conversion unit (Cml2cmos_2), and configured to receive the converted adjusted wckd2_00 of the CMOS type, the converted adjusted wckd2_180 of the CMOS type, the converted adjusted wckd2_90 of the CMOS type, and the converted adjusted wckd2_270 of the CMOS type, respectively.

The third detection circuit (DCM_E) may be configured to generate and output the duty cycle trimming signal (up/down) according to or based on the converted adjusted wckd2_00 of the CMOS type, the converted adjusted wckd2_180 of the CMOS type, the converted adjusted wckd2_90 of the CMOS type, and the converted adjusted wckd2_270 of the CMOS type.

The output port of the third detection circuit (DCM_E) may be connected to the input port of the external controller, and configured to output the duty cycle trimming signal (up/down) to the external controller.

An input port of the register is connected to the output port of the third detection circuit (DCM_E), and the register is configured to store the duty cycle trimming signal (up/down), so that the external controller may generate a Trimming code for the first duty cycle adjuster (DCA_E) according to the duty cycle trimming signal (up/down), namely, dca_e<3:0>. Finally, the first duty cycle adjuster (DCA_E) is configured to calibrate the duty cycles of a subsequent amplified wckt clock signal and a subsequent amplified wckc clock signal based on the dca_e<3:0>.

In some embodiments of the present disclosure, after the third detection circuit (DCM_E) is connected to the first active resonant load circuit (ARL1), it may be possible to accurately acquire or obtain the impact of the duty cycle of the external clock signal on the divided clock signal transmitted on the clock tree transmission path, and thus the duty cycle trimming signal (up/down) may be accurately generated, such that the external controller may generate and send down the dca_e<3:0> of the duty cycle configured to calibrate the amplified wckt clock signal and the amplified wckc clock signal. In this way, it may be possible to control the first duty cycle adjuster (DCA_E) to accurately calibrate the duty cycles of the amplified wckt clock signal and the amplified wckc clock signal, thereby reducing the impact of the wckt clock signal and wckc clock signal on the data read and write frequency of the DRAM.

As shown in FIG. 7, the first detection circuit (DCM_I_00) belongs to a Digital Clock Manager (DCM).

The first detection circuit (DCM_I_00) is arranged with two input ports, which are respectively connected to the two output ports of the second clock conversion unit (Cml2cmos_2), and configured to receive the converted adjusted wckd2_00 of the CMOS type and the converted adjusted wckd2_180 of the CMOS type output by the second clock conversion unit (Cml2cmos_2), respectively.

The output port of the first detection circuit (DCM_I_00) is connected to the control end of the first calibration circuit (DCA_I_D2_0), and configured to generate and output a first trimming signal (dca_i_00<3:0>).

The first trimming signal (dca_i_00<3:0>) may be the Trimming code for the first calibration circuit (DCA_I_D2_0), and the first calibration circuit (DCA_I_D2_0) may calibrate the duty cycles of the wckd2_00 and the wckd2_180 output by the clock reverse-phase controller (Wckd inv ctrl) according to the first trimming signal (dca_i_00<3:0>).

In some embodiments of the present disclosure, after the first calibration circuit (DCA_I_D2_0) is connected to the first active resonant load circuit (ARL1), it may be possible to accurately acquire or obtain the delay difference between the wckd2_00 and the wckd2_180 output by the clock reverse-phase controller (Wckd inv ctrl) after transmitted on the clock tree transmission path, so as to accurately generate the first trimming signal (dca_i_00<3:0>) configured to calibrate the delay difference between the wckd2_00 and the wckd2_180 output by the clock reverse-phase controller (Wckd inv ctrl). At the same time, it may be possible to control the first calibration circuit (DCA_I_D2_0) to calibrate the duty cycles of the wckd2_00 and the wckd2_180 output by the clock reverse-phase controller (Wckd inv ctrl), thereby reducing the impact of the wckd2_00 and the wckd2_180 output by the clock reverse-phase controller (Wckd inv ctrl) on the data read and write frequency of the DRAM.

As shown in FIG. 7, the second detection circuit (DCM_I_90) belongs to the Digital Clock Manager (DCM).

The second detection circuit (DCM_I_90) is arranged with two input ports, which are respectively connected to the two output ports of the second clock conversion unit (Cml2cmos_2), and configured to receive the converted adjusted wckd2_90 of the CMOS type and the converted adjusted wckd2_270 of the CMOS type output by the second clock conversion unit (Cml2cmos_2), respectively.

The output port of the second detection circuit (DCP_I_90) is connected to the control end of the second calibration circuit (DCA_I_D2_90), and configured to generate and output a second trimming signal (dca_i_90<3:0>).

The second trimming signal (dca_i_90<3:0>) may be the Trimming code for the second calibration circuit (DCA_I_D2_90), and the second calibration circuit (DCA_I_D2_90) may calibrate the duty cycles of the wckd2_90 and the wckd2_270 output by the clock reverse-phase controller (Wckd inv ctrl) according to the first trimming signal (dca_i_00<3:0>).

In some embodiments of the present disclosure, after the second calibration circuit (DCA_I_D2_90) is connected to the first active resonant load circuit (ARL1), it may be possible to accurately acquire or obtain the delay difference between the wckd2_90 and the wckd2_270 output by the clock reverse-phase controller (Wckd inv ctrl) after transmitted on the clock tree transmission path, so as to accurately generate the first trimming signal (dca_i_90<3:0>) configured to calibrate the delay difference between the wckd2_90 and the wckd2_270 output by the clock reverse-phase controller (Wckd inv ctrl). At the same time, it may be possible to control the first calibration circuit (DCA_I_D2_0) to accurately calibrate the duty cycles of the wckd2_90 and the wckd2_270 output by the clock reverse-phase controller (Wckd inv ctrl), thereby reducing the impact of the wckd2_90 and the wckd2_270 output by the clock reverse-phase controller (Wckd inv ctrl) on the data read and write frequency of the DRAM.

As shown in FIG. 7, in a practical application, the output port of the second active resonant load circuit (ARL2) may be connected to a data channel (dp_1 bit and/or dp_2 bit) of the memory via the third clock conversion unit (Cml2cmos_3).

Figure 8:
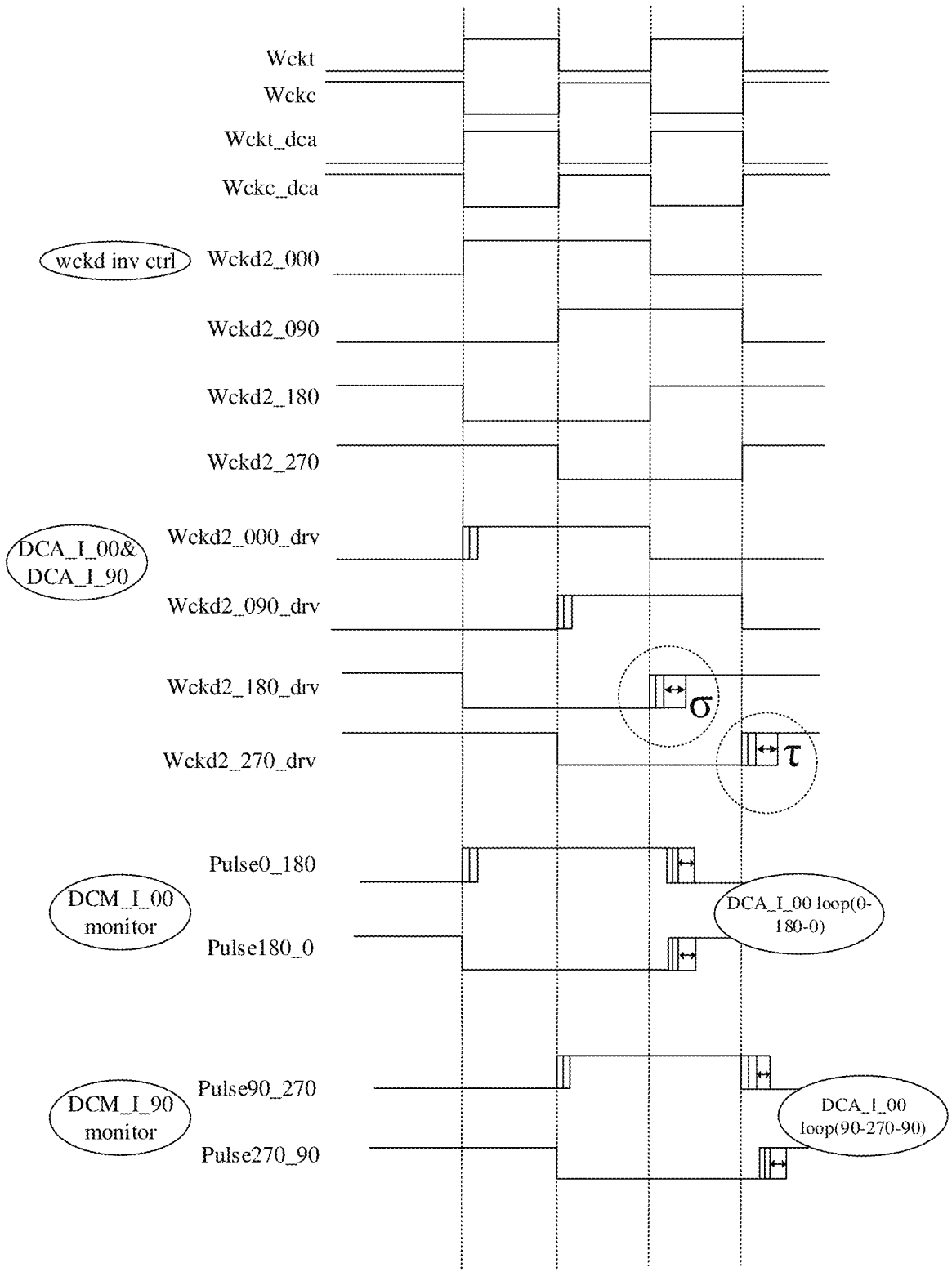
FIG. 8 is a clock logic timing diagram of a first duty cycle adjuster (DCA_E), a first calibration circuit (DCA_I_D2_0), and a second calibration circuit (DCA_I_D2_90) when the delay calibration circuit as shown in FIG. 7 is in operation.
Figure 9:
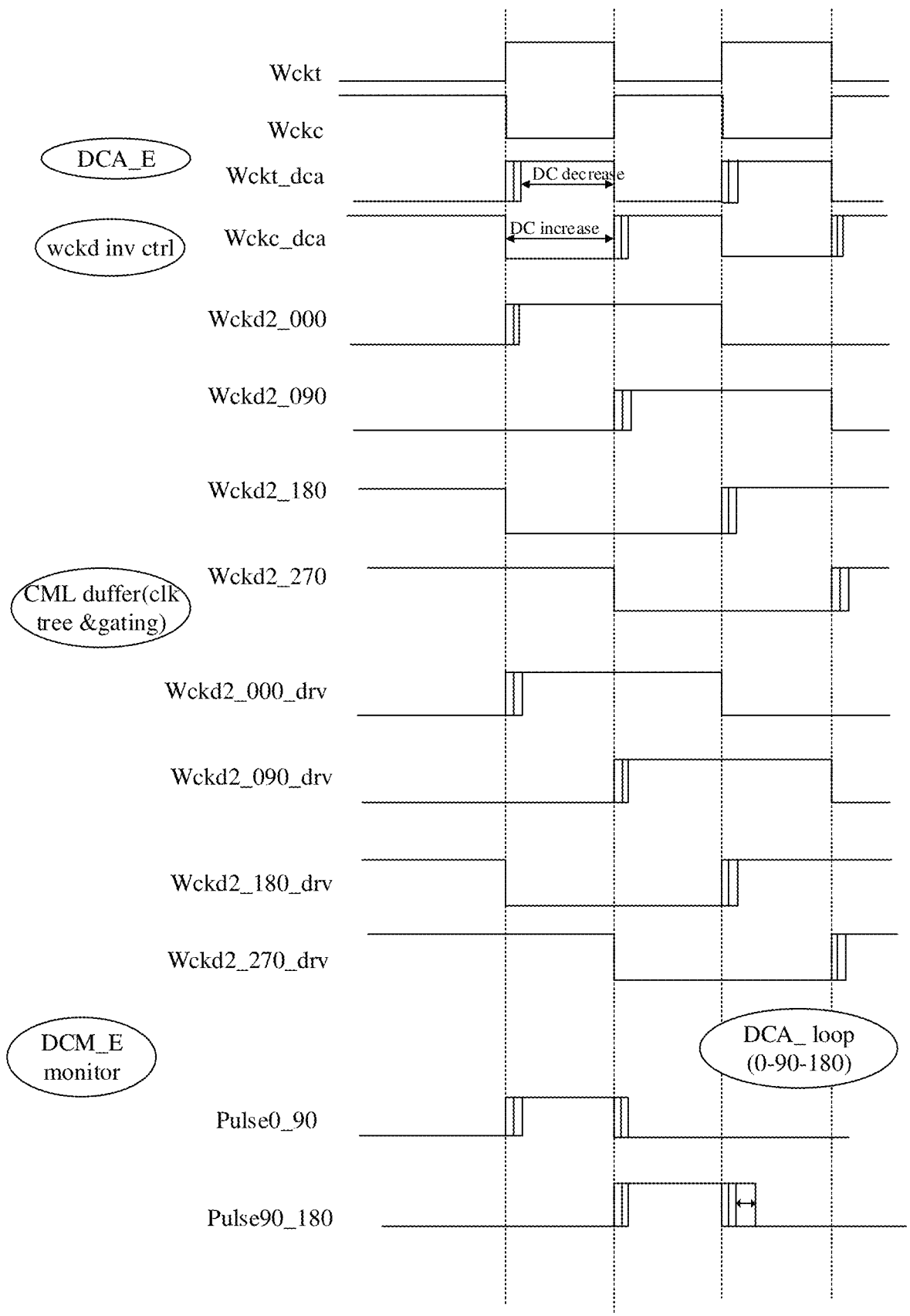
FIG. 9 is a clock logic timing diagram of a first detection circuit, a second detection circuit, and a third detection circuit when the delay calibration circuit as shown in FIG. 7 is in operation.

Herein, the application of the delay calibration circuit shown in FIG. 7 in DRAM may be taken as an example, so as to describe an operation principle of the first duty cycle adjuster (DCA_E), the first calibration circuit (DCA_I_D2_0), and the second calibration circuit (DCA_I_D2_90). As shown in FIG. 8, FIG. 8 is a clock logic timing diagram of a first duty cycle adjuster (DCA_E), a first calibration circuit (DCA_I_D2_0), and a second calibration circuit (DCA_I_D2_90) when the delay calibration circuit as shown in FIG. 7 is in operation. As shown in FIG. 9, FIG. 9 is a clock logic timing diagram of a first detection circuit, a second detection circuit, and a third detection circuit when the delay calibration circuit as shown in FIG. 7 is in operation.

The operation principle of the first duty cycle adjuster (DCA_E) is as follows.

As shown in FIG. 8, the first duty cycle adjuster (DCA_E) is set or arranged before the division unit (Div2), and configured to adjust the duty cycles of the received amplified wckt clock signal and the received amplified wckc clock signal. When a value of the duty cycle of the clock signal sent to the DRAM by the external clock signal source deviates from 50% to a preset threshold, i.e., when a difference between a value of the duty cycle of the clock signal sent to the DRAM by the external clock signal source and 50% reaches to the present threshold, at this time, the external controller will control and adjust the duty cycles of the amplified wckt clock signal and the amplified wckc clock signal, so as to ensure that a clock pulse width entering the division unit (Div2) is sufficient, which will not affect the highest operating frequency of the division unit (Div2).

As shown in FIG. 9, the third detection circuit (DCM_E) is set at an end of an entire clock path, so as to monitor pulse widths of the converted adjusted wckd2_00 of the CMOS type, the converted adjusted wckd2_180 of the CMOS type, the converted adjusted wckd2_90 of the CMOS type, and the converted adjusted wckd2_270 of the CMOS type, and thus the duty cycle trimming signal (up/down) indicating that the duty cycle of the wckt clock signal or the duty cycle of the wckc clock signal being greater than 50% or less than 50% may be generated according to a monitoring result. Then, the third detection circuit (DCM_E) will store the duty cycle trimming signal (up/down) in the register. The external controller (Controller) will adjust the Trimming code dca_e<3:0> sent to the first duty cycle adjuster (DCA_E) according to the information read by the move to register from state register (MRS) at intervals, and adjust the corresponding clock duty cycle.

The specific execution process includes the following process.

Firstly, DCM_E may detect the pulse widths of the converted adjusted wckd2_00 of the CMOS type, the converted adjusted wckd2_180 of the CMOS type, the converted adjusted wckd2_90 of the CMOS type, and the converted adjusted wckd2_270 of the CMOS type, respectively. According to a comparison result of the pulse widths, a flag signal that the duty cycle of the wckt clock signal or the duty cycle of the wckc clock signal is greater than 50% or less than 50% is generated, namely, a duty cycle trimming signal (up/down), and is stored in the internal register of the DRAM.

In some embodiments, if the duty cycle of the external clock signal is greater than 50% and a difference value between the duty cycle of the external clock signal and 50% reaches the preset threshold, a flag signal (i.e. up/down) indicating that a duty cycle of the wckt clock signal is greater than 50% is generated. If the duty cycle of the external clock signal is less than 50% and a difference value between the duty cycle of the external clock signal and 50% reaches the preset threshold, a flag signal indicating that a duty cycle of the wckt clock signal is less than 50% is generated.

Secondly, the central processing unit (namely, controller) may use a MRS command to read a flag signal (i.e. up/down) from the register at intervals, and based on the flag signal (i.e. up/down), a set of Trimming codes (dca_e<3:0>) are provided to the first duty cycle adjuster (DCA_E).

In some embodiments, if a duty cycle trimming signal (up/down) read by the central processing unit from the register indicating that the duty cycle of the wckt clock signal is less than 50%, the rising edge of the subsequent amplified wckt clock signal may be adjusted. If a duty cycle trimming signal (up/down) read by the central processing unit from the register indicating that the duty cycle of the wckt clock signal is greater than 50%, the rising edge of the subsequent amplified wckc clock signal may be adjusted.

The operation principle of the first calibration circuit (DCA_I_D2_0) is as follows.

As shown in FIG. 8, the first calibration circuit (DCA_I_D2_0) is disposed between the division unit (Div2) and the buffer (CML buffer), and configured to adjust the duty cycle of the wckd2_00 and the wckd2_180 output by the clock reverse-phase controller (Wckd inv ctrl), and thus it may be possible to adjust the delay difference on the clock tree transmission path between the wckd2_00 and the wckd2_180 output by the clock reverse-phase controller (Wckd inv ctrl).

As shown in FIG. 9, the first detection circuit (DCM_I_00) is disposed at the end of the entire clock path, so as to monitor pulse widths generated by the converted adjusted wckd2_00 of the CMOS type and the converted adjusted wckd2_180 of the CMOS type output by the second clock conversion unit (Cml2cmos_2), generate the first trimming signal (dca_i_00<3:0>) based on the pulse widths, send the first trimming signal (dca_i_00<3:0>) generated based on the pulse widths to the first calibration circuit (DCA_I_D2_0), and perform calibration operation on the wckd2_00 and the wckd2_180 output by the controller (Wckd inv ctrl), thereby ensuring that the transmission delays of the wckd2_00 and the wckd2_180 output by the controller (Wckd inv ctrl) are equal to each other.

The execution process is as follows.

The first detection circuit (DCM_I_00) detects pulse widths generated by the converted adjusted wckd2_00 of the CMOS type and the converted adjusted wckd2_180 of the CMOS type output by the second clock conversion unit (Cml2cmos_2). According to a comparison result of the pulse width of the converted adjusted wckd2_00 and the pulse width of the converted adjusted wckd2_180, the first trimming signal (dca_i_00<3:0>) is send to the first calibration circuit (DCA_I_D2_0), the duty cycle output by the clock reverse-phase controller (Wckd inv ctrl) is controlled to be adjusted, so as to adjust the delays of the rising edges of the wckd2_00 or the wckd2_180 output by the clock reverse-phase controller (Wckd inv ctrl), thereby ensuring that the transmission delay difference on the clock tree between the wckd2_00 and the wckd2_180 output by the clock reverse-phase controller (Wckd inv ctrl) is zero.

The operation principle of the second calibration circuit (DCA_I_D2_00) is as follows.

As shown in FIG. 8, the second calibration circuit (DCA_I_D2_90) is disposed between the division unit (Div2) and the buffer (CML buffer), and configured to adjust the duty cycle of the wckd2_90 and the wckd2_270 output by the clock reverse-phase controller (Wckd inv ctrl), and thus it may be possible to adjust the delay difference on the clock tree transmission path between the wckd2_90 and the wckd2_270 output by the clock reverse-phase controller (Wckd inv ctrl).

As shown in FIG. 9, the second detection circuit (DCM_I_90) is disposed at the end of the entire clock path, so as to monitor pulse widths generated by the converted adjusted wckd2_90 of the CMOS type and the converted adjusted wckd2_270 of the CMOS type output by the second clock conversion unit (Cml2cmos_2), generate the second trimming signal (dca_i_90<3:0>) based on the pulse widths, send the second trimming signal (dca_i_90<3:0>) generated based on the pulse widths to the second calibration circuit (DCA_I_D2_90), adjust the duty cycles of wckd2_90 and the wckd2_270 output by the controller (Wckd inv ctrl), thereby ensuring that the transmission delays of the wckd2_90 and the wckd2_270 output by the controller (Wckd inv ctrl) are equal to each other.

The specific execution process is as follows.

The second detection circuit (DCP_I_90) detects pulse widths generated by the converted adjusted wckd2_90 of the CMOS type and the converted adjusted wckd2_270 of the CMOS type output by the second clock conversion unit (Cml2cmos_2). According to a comparison result of the pulse width of the converted adjusted wckd2_90 and the pulse width of the converted adjusted wckd2_270, the second trimming signal (dca_i_90<3:0>) is send to the second calibration circuit (DCA_I_D2_90), and the delay of the rising edge of the wckd2_00 or the delay of the rising edge of the wckd2_180 output by the clock reverse-phase controller (Wckd inv ctrl) is controlled to be adjusted, thereby ensuring that the transmission delay difference on the clock tree between the wckd2_00 and the wckd2_180 output by the clock reverse-phase controller (Wckd inv ctrl) is zero.

Figures 10, 11:
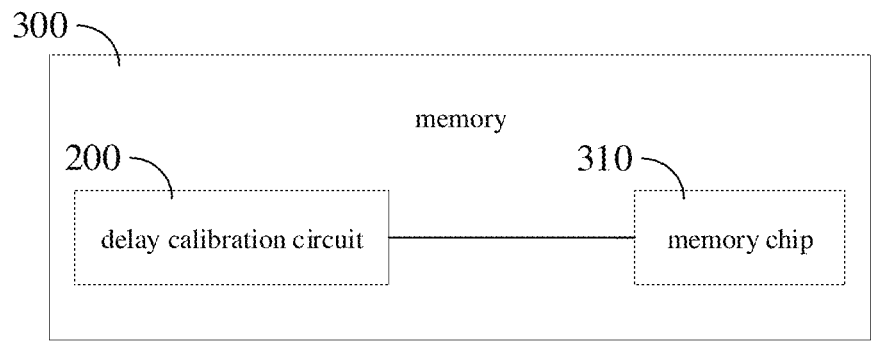
FIG. 10 is a schematic structural diagram of a memory according to some embodiments of the present disclosure.
FIG. 11 is a flow chart of an external clock signal calibration method according to some embodiments of the present disclosure.

Based on the same application concept as that in the above-mentioned embodiments, a memory is further provided by the embodiment of the present disclosure. As shown in FIG. 10, FIG. 10 is a schematic structural diagram of a memory according to some embodiments of the present disclosure. A memory 300 includes a memory chip 310 and a delay calibration circuit 200.

The memory chip 310 is arranged with a data channel (dp_1 bit and/or dp_2 bit). The delay calibration circuit 200 may be electrically connected to a data channel 202 (dp_1 bit and/or dp_2 bit) via a third clock conversion unit 201 (Cml2cmos_3).

The delay calibration circuit 200 is connected to the memory chip 310 and configured to receive an external clock signal from the memory chip 310.

An output port of the delay calibration circuit 200 is connected to the data channel 202 via the third clock conversion unit 201, and configured to provide the DRAM with an accurately converted adjusted divided clock signal, thereby reducing the impact of the divided clock signal on the read and write frequency of the DRAM when the divided clock signal is transmitted in the clock tree.

In some embodiments, the delay calibration circuit 200 adopts the above-mentioned delay calibration circuit, which is not be repeated herein.

Based on the same application concept as that in the above-mentioned embodiments, an external clock signal calibration method is further provided by some embodiments of the present disclosure. As shown in FIG. 11, FIG. 11 is a flow chart of an external clock signal calibration method according to some embodiments of the present disclosure. The method may be applied to any of the above-described memory, and the method includes the following operations.

At an operation S11, pulse widths of at least two channels of previous adjusted divided clock signals are detected, and a trimming signal is generated based on the pulse widths.

The at least two channels of previous adjusted divided clock signals are generated based on an external clock signal.

In some embodiments, the above-mentioned divided clock generation circuit 110 may be configured to generate the at least two channels of previous adjusted divided clock signals.

In some embodiments, the above-mentioned detection circuit 130 may be configured to perform the operation S11.

At an operation S12, delays of at least two channels of divided clock signals are adjusted based on the trimming signal, and at least two channels of current adjusted divided clock signals are output.

In some embodiments, the above-mentioned calibration circuit 120 may be configured to perform the operation S12.

In some embodiments, the operation S12 includes operations S21 and S22.

At the operation S21, the at least two channels of divided clock signals include a first divided clock signal, a second divided clock signal, a third divided clock signal, and a fourth divided clock signal, delays corresponding to rising edges of the first divided clock signal and the third divided clock signal are adjusted based on a first trimming signal of the trimming signal, such that the delays of the first divided clock signal and the third divided clock signal are equal to each other. The at least two channels of divided clock signals include the two channels of divided clock signals.

At the operation S22, delays corresponding to rising edges of the second divided clock signal and the fourth divided clock are adjusted based on a second trimming signal of the trimming signal, such that the delays of the second divided clock signal and the fourth divided clock are equal to each other.

In some embodiments, the method further includes operations S31 to S32.

At an operation S31, based on at least two channels of divided clock signals, a duty cycle of the external clock signal is detected.

In some embodiments, the above-mentioned third detection circuit (DCM_E) may be configured to perform the operation S31.

At an operation S32, in response to the duty cycle deviating from a preset value, a duty cycle trimming signal is output.

In some embodiments, the above-mentioned third detection circuit (DCM_E) may be configured to perform the operation S32.

At an operation 533, a duty cycle of the external clock signal is adjusted based on the duty cycle trimming signal.

In some embodiments, the above-mentioned first duty cycle adjuster (DCA_E) may be configured to perform the operation S33.

In technical solutions according to embodiments of the present disclosure have at least the following technical effects or advantages.

In some embodiments of the present disclosure, a divided clock generation circuit is arranged with a calibration circuit and a detection circuit. The detection circuit may detect pulse widths of at least two channels of divided clock signals output by the divided clock generation circuit, and generate a trimming signal based on the pulse widths. The calibration circuit may adjust delays of the at least two channels of divided clock signals based on the trimming signal, and output adjusted divided clock signals which are used by a memory. In some embodiments of the present disclosure, it may be possible to reduce the impact of an original low-quality external clock signal on the pulse width of the divided clock signal, improve the stability of the divided clock signal, and improve the read and write frequency of the memory, thereby enabling the memory to perform a high-speed data read and write operation under the trigger of a more stable divided clock signal.

Although some embodiments of the present disclosure have been described, those skilled in the art may make additional changes and modifications to the embodiments once they know the basic concept of creation. Therefore, the attached claims are intended to be interpreted as including the preferred embodiments and all changes and modifications falling within the scope of the present disclosure.

What is claimed is:

1. A delay calibration circuit, comprising:
    a divided clock generation circuit, configured to receive an input external clock signal and output at least two channels of divided clock signals based on the external clock signal;
    a calibration circuit, connected to the divided clock generation circuit, and configured to adjust delays of the at least two channels of divided clock signals based on a trimming signal and output at least two channels of current adjusted divided clock signals; and
    a detection circuit, connected to the calibration circuit, and configured to detect pulse widths of at least two channels of previous adjusted divided clock signals and generate the trimming signal based on the pulse widths,
    wherein the calibration circuit comprises:
        a first calibration circuit and a second calibration circuit, connected to the divided clock generation circuit respectively, and configured to output calibrated divided clock signals:
        a buffer, connected to the first calibration circuit and the second calibration circuit, and configured to receive and store the calibrated divided clock signals; and
        an active resonant load circuit, connected to the buffer, and configured to adjust buffered calibrated divided clock signals transmitted to the active resonant load circuit to match the calibrated divided clock signals transmitted to the buffer.

2. The delay calibration circuit according to claim 1, wherein the divided clock generation circuit is configured to output four channels of divided clock signals based on the external clock signal, and the four channels of divided clock signals comprise a first divided clock signal, a second divided clock signal, a third divided clock signal, and a fourth divided clock signal,
    wherein the first calibration circuit is configured to adjust delays corresponding to rising edges of the first divided clock signal and the third divided clock signal based on a first trimming signal of the trimming signal and output a first calibrated divided clock signal and a third calibrated divided clock signal, and
    wherein the second calibration circuit is configured to adjust delays corresponding to rising edges of the second divided clock signal and the fourth divided clock signal based on a second trimming signal of the trimming signal and output a second calibrated divided clock signal and a fourth calibrated divided clock signal.

3. The delay calibration circuit according to claim 2, wherein the first calibration circuit is configured to adjust delays corresponding to the rising edges of the first divided clock signal and the third divided clock signal based on the first trimming signal, and
    the second calibration circuit is configured to adjust delays corresponding to the rising edges of the second divided clock signal and the fourth divided clock signal based on the second trimming signal.

4. The delay calibration circuit according to claim 3, wherein the delays of the first divided clock signal and the third divided clock signal adjusted by the first calibration circuit are equal to each other, and
    the delays of the second divided clock signal and the fourth divided clock signal adjusted by the second calibration circuit are equal to each other.

5. The delay calibration circuit according to claim 3, wherein the detection circuit comprises:
    a first detection circuit, connected to the first calibration circuit, and configured to detect a first pulse width of each of a first previous calibrated divided clock signal and a third previous calibrated divided clock signal and generate the first trimming signal based on the first pulse width; and
    a second detection circuit, connected to the second calibration circuit, and configured to detect a second pulse width of each of a second previous calibrated divided clock signal and a fourth previous calibrated divided clock signal and generate the second trimming signal based on the second pulse width.

6. The delay calibration circuit according to claim 2, wherein a phase difference between the four channels of divided clock signals is 90° in sequence, a phase difference between the first divided clock signal and the third divided clock signal is 180°, and a phase difference between the second divided clock signal and the fourth divided clock signal is 180°.

7. The delay calibration circuit according to claim 1, wherein the divided clock generation circuit comprises:
   a clock signal receiving unit, configured to receive and amplify the external clock signal; and
   a first duty cycle adjuster, connected to the clock signal receiving unit, and configured to adjust a duty cycle of the external clock signal based on a duty cycle trimming signal and output a calibrated clock signal.

8. The delay calibration circuit according to claim 7, wherein the detection circuit further comprises:
   a third detection circuit, connected to the first duty cycle adjuster, and configured to detect a duty cycle of a previous external clock signal,
   wherein in response to the duty cycle deviating from a preset value, the third detection circuit is configured to output the duty cycle trimming signal.

9. The delay calibration circuit according to claim 7, wherein the divided clock generation circuit further comprises:
   a division unit, connected to the first duty cycle adjuster, and configured to perform frequency division on the calibrated clock signal to obtain four channels of pre-divided clock signals, wherein the four channels of pre-divided clock signals comprise a first pre-divided clock signal, a second pre-divided clock signal, a third pre-divided clock signal, and a fourth pre-divided clock signal, a phase difference between the first pre-divided clock signal and the second pre-divided clock signal is 90°, a phase difference between the second pre-divided clock signal and the third pre-divided clock signal is 90°, and a phase difference between the third pre-divided clock signal and the fourth pre-divided clock signal is 900;
   a first clock conversion unit, connected to the division unit, and configured to convert the pre-divided clock signal into a divided digital clock signal;
   a clock synchronization alignment circuit, connected to the first clock conversion unit, and configured to generate a reverse-phase control parameter based on the divided digital clock signal; and
   a clock reverse-phase controller, connected to the division unit and the clock synchronization alignment circuit, and configured to perform reverse-phase processing on the at least one of a first group of pre-divided clock signals and a second group of pre-divided clock signals under the control of the reverse-phase control parameter, and align at least one of the first group of pre-divided clock signals and the second group of pre-divided clock signals, wherein the first group of pre-divided clock signals comprise the first pre-divided clock signal and the third pre-divided clock signal, and the second group of pre-divided clock signals comprise the second pre-divided clock signal and the fourth pre-divided clock signal.

10. The delay calibration circuit according to claim 9, wherein the pre-divided clock signal comprises a first pre-divided clock signal of Current Mode Logic (CML) type, a second pre-divided clock signal of CML type, a third pre-divided clock signal of CML type, and a fourth pre-divided clock signal of CML type;
   the first clock conversion unit comprises a first input port and a second input port, the first input port of the first clock conversion unit is configured to receive the first pre-divided clock signal of CML type and the second input port of the first clock conversion unit configured to receive the third pre-divided clock signal of CML type, or the first input port of the first clock conversion unit is configured to receive the second pre-divided clock signal of CML type and the second input port of the first clock conversion unit is configured to receive the fourth pre-divided clock signal of CML type; and
   the first clock conversion unit comprises a first output port and a second output port, the first output port of the first clock conversion unit is configured to output a first divided digital clock signal of CMOS type and the second output port of the first clock conversion unit is configured to output a third divided digital clock signal of CMOS type, or the first output port of the first clock conversion unit is configured to output a second divided digital clock signal of CMOS type and the second output port of the first clock conversion unit is configured to output a fourth divided digital clock signal of CMOS type.

11. The delay calibration circuit according to claim 10, wherein the clock synchronization alignment circuit comprises a first input port and a second input port, the first input port of the clock synchronization alignment circuit is connected to the first output port of the first clock conversion unit, and the second input port of the clock synchronization alignment circuit is connected to the second output port of the first clock conversion unit, the first input port of the clock synchronization alignment circuit is configured to receive the first pre-divided clock signal of the CMOS type and the second input port of the clock synchronization alignment circuit is configured to receive the third pre-divided clock signal of the CMOS type, or the first input port of the clock synchronization alignment circuit is configured to receive the second pre-divided clock signal of the CMOS type and the second input port of the clock synchronization alignment circuit is configured to receive the fourth pre-divided clock signal of the CMOS type.

12. The delay calibration circuit according to claim 7, wherein the external clock signal comprises a wckt clock signal and a wckc clock signal, and the wckt clock signal and the wckc clock signal are clock signals opposite to each other in phase,
   the clock signal receiving unit comprises a first input port and a second input port, the first input port of the clock signal receiving unit is configured to receive the wckt clock signal, and the second input port of the clock signal receiving unit is configured to receive the wckc clock signal, and
   the clock signal receiving unit further comprises a first output port and a second output port, the first output port is configured to output an amplified wckt clock signal, and the second output port of the clock signal receiving unit is configured to output an amplified wckc clock signal.

13. The delay calibration circuit according to claim 7, wherein the duty cycle trimming signal comprises a UP state and a DOWN state, the UP state configured to indicate that the duty cycle of a current external clock signal is greater than 50%, and the DOWN state configured to indicate that the duty cycle of the current external clock signal is less than 50%.

14. A memory, comprising:
   a memory chip; and
   a delay calibration circuit, connected to the memory chip and configured to receive an external clock signal from the memory chip,
   wherein the delay calibration circuit comprises:

a divided clock generation circuit, configured to receive the external clock signal and output at least two channels of divided clock signals based on the external clock signal;

a calibration circuit, connected to the divided clock generation circuit, and configured to adjust delays of the at least two channels of divided clock signals based on a trimming signal and output at least two channels of current adjusted divided clock signals; and a detection circuit, connected to the calibration circuit, and configured to detect pulse widths of at least two channels of previous adjusted divided clock signals and generate the trimming signal based on the pulse widths, wherein the calibration circuit comprises:
- a first calibration circuit and a second calibration circuit, connected to the divided clock generation circuit respectively, and configured to output calibrated divided clock signals;
- a buffer, connected to the first calibration circuit and the second calibration circuit and configured to receive and store the calibrated divided clock signals; and
- an active resonant load circuit, connected to the buffer, and configured to adjust buffered calibrated divided clock signals transmitted to the active resonant load circuit to match the calibrated divided clock signals transmitted to the buffer.

15. The memory according to claim 14, wherein the divided clock generation circuit is configured to output four channels of divided clock signals based on the external clock signal, and the four channels of divided clock signals comprise a first divided clock signal, a second divided clock signal, a third divided clock signal, and a fourth divided clock signal, wherein the first calibration circuit is configured to adjust delays corresponding to rising edges of the first divided clock signal and the third divided clock signal based on a first trimming signal of the trimming signal and output a first calibrated divided clock signal and a third calibrated divided clock signal, and wherein the second calibration circuit is configured to adjust delays corresponding to rising edges of the second divided clock signal and the fourth divided clock signal based on a second trimming signal of the trimming signal and output a second calibrated divided clock signal and a fourth calibrated divided clock signal.

16. The memory according to claim 14, wherein the divided clock generation circuit comprises:
- a clock signal receiving unit, configured to receive and amplify the external clock signal; and
- a first duty cycle adjuster, connected to the clock signal receiving unit, and configured to adjust a duty cycle of the external clock signal based on a duty cycle trimming signal and output a calibrated clock signal.

17. A clock signal calibration method, comprising:

detecting pulse widths of at least two channels of previous adjusted divided clock signals, and generating a trimming signal based on the pulse widths, wherein the at least two channels of previous adjusted divided clock signals are generated based on an external clock signal; and adjusting delays of at least two channels of divided clock signals based on the trimming signal, and outputting at least two channels of current adjusted divided clock signals, wherein the method further comprises:
- detecting a duty cycle of the external clock signal;
- outputting a duty cycle trimming signal in response to the duty cycle deviating from a preset value; and
- adjusting the duty cycle of the external clock signal based on the duty cycle trimming signal.

18. The clock signal calibration method according to claim 17, wherein the at least two channels of divided clock signals comprise a first divided clock signal, a second divided clock signal, a third divided clock signal, and a fourth divided clock signal, and wherein the adjusting delays of at least two channels of divided clock signals based on the trimming signal comprises:
- adjusting delays corresponding to rising edges of the first divided clock signal and the third divided clock signal based on a first trimming signal of the trimming signal, such that the delays of the first divided clock signal and the third divided clock signal are equal to each other; and
- adjusting delays corresponding to rising edges of the second divided clock signal and the fourth divided clock signal based on a second trimming signal of the trimming signal, such that the delays of the second divided clock signal and the fourth divided clock signal are equal to each other.

* * * * *